INVENTORS
Edward Ringly
Edward J. Grazulis
BY ATTORNEY

INVENTORS
Edward Ringly
Edward J. Grazulis

United States Patent Office 3,311,682
Patented Mar. 28, 1967

3,311,682
PROCESS FOR EXTRUSION OF TUBULAR PLASTIC FILM WITH EXTERNAL AND INTERNAL SPRAY COOLING
Edward Ringley, Wycoff, and Edward J. Grazulis, Clifton, N.J., assignors, by mesne assignments, to Gulf Oil Corporation, Pittsburgh, Pa., a corporation of Pennsylvania
Filed Oct. 21, 1963, Ser. No. 317,711
1 Claim. (Cl. 264—95)

This invention relates to improved thermoplastic polymer extrusion processes.

Thermoplastic polymer films, particularly films prepared from crystalline thermoplastic polymers such as polyethylene and polypropylene, constitute one of the largest outlets for thermoplastic polymers. Notwithstanding the fact that a prodigious volume of work has been carried out on film-manufacturing processes, it is recognized that processes for the manufacture of thermoplastic polymer films still suffer from a number of shortcomings. One of the primary deficiencies of existing processes is that they are relatively expensive. Specifically, most films cost at least twice as much as the thermoplastic polymers employed in their manufacture. The lowest-cost process currently employed in manufacturing thermoplastic polymer films is the well-known blow-extrusion or trapped-bubble process. The major factors which hurt the economics of the blow-extrusion process are the high capital cost per unit of productive capacity and the substantial percentage of the manufactured film which fails to meet critical manufacturing specifications. Another deficiency of existing film processes, particularly the blow-extrusion process, is that the film so-produced is deficient in certain respects.

We have now discovered a novel, highly flexible extrusion process which is decidedly superior to the currently-used blow-extrusion film processes. Specifically, the cost of converting thermoplastic polymer to film is substantially lower and, in addition, the film so-produced is distinctly superior to film prepared by currently-employed blow-extrusion processes.

The present invention, in its broadest aspect, comprises a critical combination of steps in which a thermoplastic polymer is extruded as a tube at an elevated temperature, e.g. above about 270° F., at a rate of at least 8 lbs./hr. per circumferential inch of die-opening and the extruded tube, within about 4 die diameters downstream from the die, is contacted with a thin spray of cooling liquid such as water which contacts its entire exterior circumference in a plane substantially transverse to the direction of extrusion. The cooling liquid cools the hot tube to below about 180° F. within 1 second. The rapid rate at which the tube is cooled permits the process to be operated at very high speeds and substantially lowers the cost of producing polymer film. The film produced by the process of this invention, particularly film prepared from low-density polyethylene, has greatly improved physical and optical properties which will be subsequently described in greater detail.

The nature of the invention and the advantages thereof will be better understood from the following detailed description thereof when read in conjunction with the drawings in which.

Figure 1:
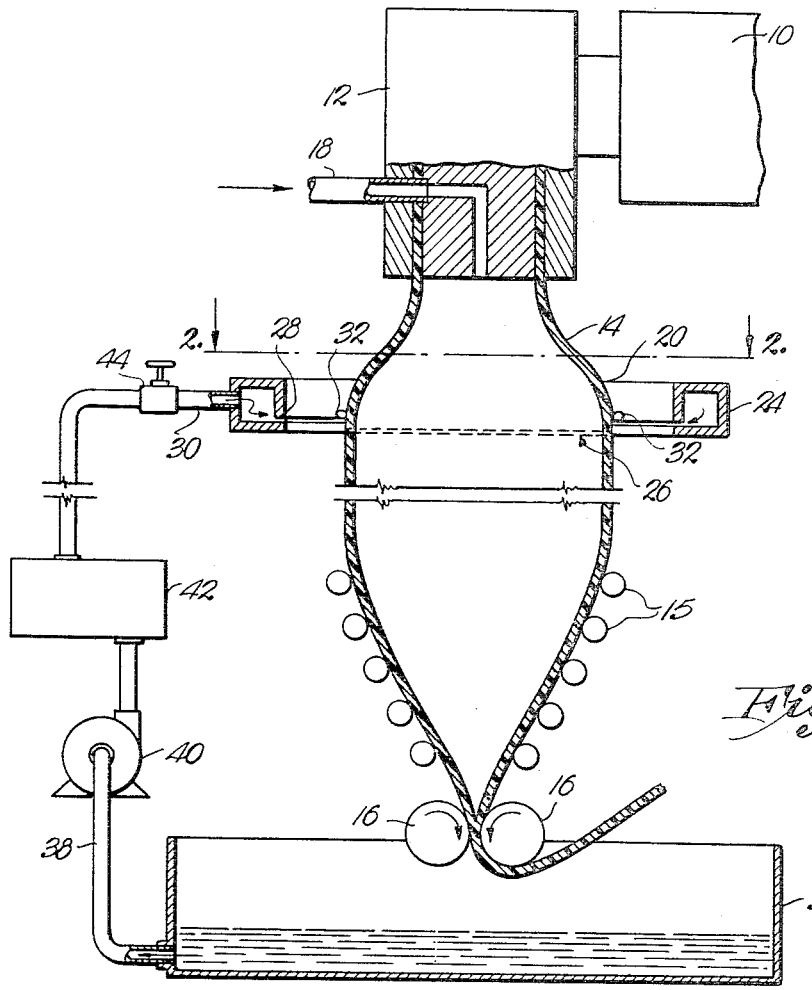
FIG. 1 is a vertical view, partially in section, of one embodiment of the invention.
Figure 2:
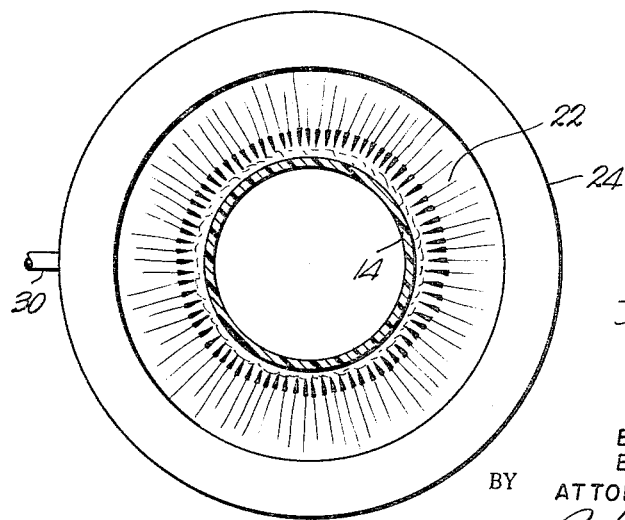
FIG. 2 is a view taken through line 2—2 of FIG. 1.

Referring to FIGS. 1 and 2, hot polymer, such as low-density polyethylene, is fed from a conventional screw extruder 10 into a conventional blow-extrusion die 12. The hot polymer is extruded in the form of a tube 14 and, after being cooled as subsequently described, is collapsed by rolls 15 and passes through nip rolls 16 which seal tube 14. Nip rolls 16 also function to draw tube 14 from die 12 to reduce the wall thickness of the tube and orient the polymer in the machine direction. Air at a pressure on the order of 0.1–2.0 p.s.i.g. is introduced into tube 14 through line 18 and expands the tube. The expansion of the tube reduces the wall thickness of tube 14 and orients the film transversely to the machine direction. The operations above-described are conventional in blow-extrusion processes.

Approximately one die diameter downstream from the face of die 12, tube 14 has its exterior surface shock-cooled by cooling liquid 22, delivered from a cored liquid cooling ring 24. Cooling ring 24 can be raised and lowered in a vertical plane by support means not shown. The cooling liquid rapidly cools the temperature of tube 14 to below about 180° F. within less than 1.0 second. When the extruded polymer is low-density polyethylene or another crystalline polymer, the temperature of the extruded tube can be measured by observing the appearance of frostline 26. With low-density polyethylene, the frostline appears when the temperature is reduced to about 180° F.

The cored liquid cooling ring is generally circular in cross-section and resembles a doughnut in appearance. In its interior face is provided a 2–20 mil, and preferably an 8 mil, slit opening 28. Water under pressure is introduced into cooling ring 24 from line 30 and is forced out of the cooling ring through slit opening 28 at a high velocity. The cooling liquid as it is forced from opening 28 forms a continuous liquid sheet which is best seen in FIG. 2. The sheet of cooling liquid, on contacting tube 14, is broken up and forms a turbulent column of liquid 32 which initially contacts tube 14. Tube 14 is cooled very rapidly and frostline 26 appears within about 1 inch of the point at which the water sheet contacts tube 14.

The cooling liquid which flows down tube 14 is collected in trough 36 and is recirculated. The water is withdrawn from trough 36 by means of line 38 and pump 40. A filter 42 is included upstream in line 30 to remove any suspended particles whose maximum diameter exceeds 10 microns. A valve 44 is provided in line 30 to further control the volume of cooling liquid delivered to cooling ring 24. As needed, makeup water is introduced into trough 36 by means of a water line not shown.

Figure 3:
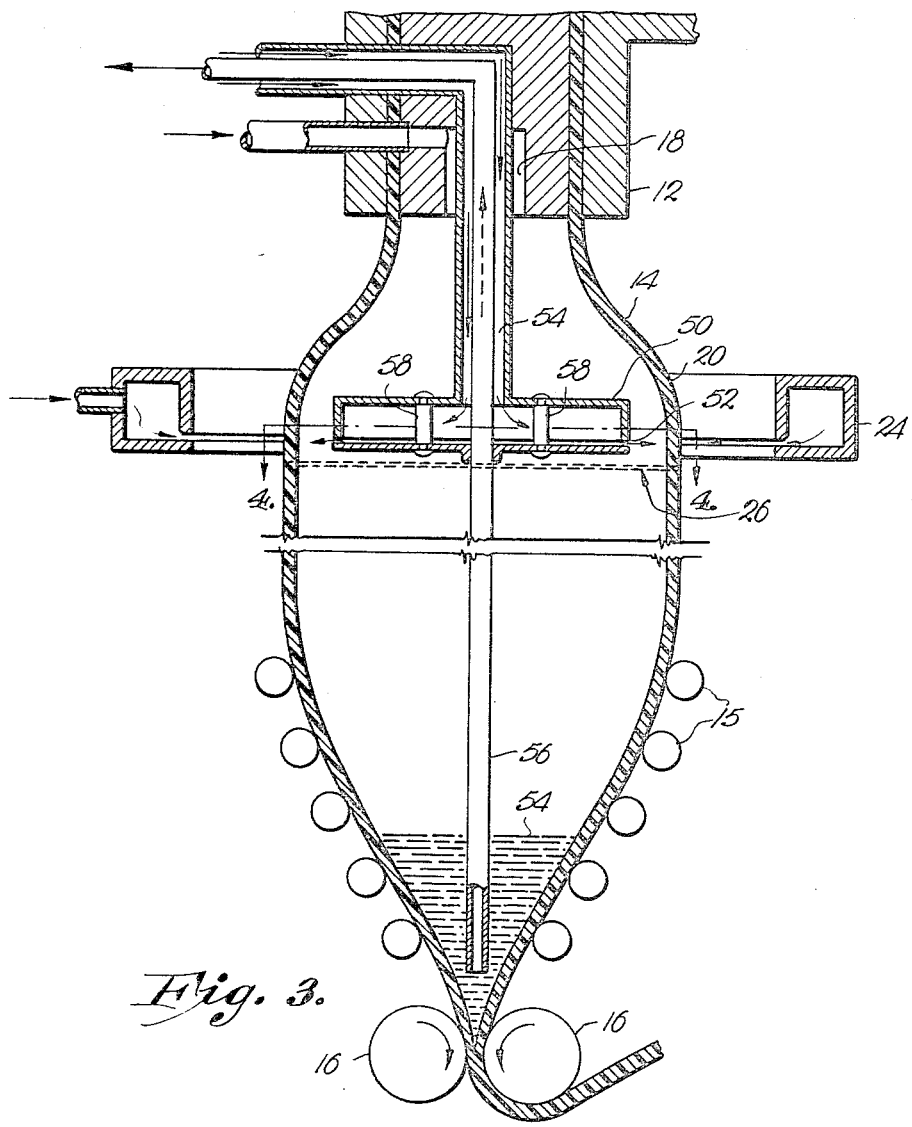
FIG. 3 is a vertical view, partially in section, of another embodiment of the invention.
Figure 4:
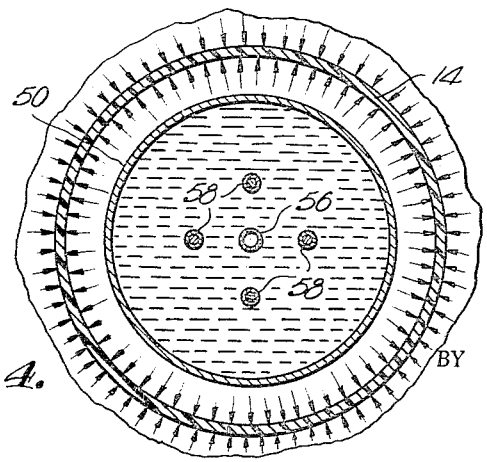
FIG. 4 is a view taken through line 4—4 of FIG. 3.

The embodiment of the invention illustrated in FIG. 3 is generally similar to that illustrated in FIG. 1 except that second cooling means are positioned within tube 14 to shock-cool the interior surface of tube 14. This secondary cooling means consists of a cored circular disc 50 having a slit opening 52 provided in its face adjacent to tube 14. Cooling liquid under pressure is fed through line 54 into disc 50 and is forced through slit opening 52 as a continuous liquid sheet which contacts the interior surface of tube 14. Cored circular disc 50 and exterior cored cooling ring 24 are positioned so that the cooling liquids forced therefrom contact tube 14 in the same transverse plane.

The liquid forced from disc 52 collects into a pool 54 which is withdrawn through line 56 by pumping means not shown. Tube 14 is expanded by air which is introduced through line 18. A series of tubular passageways 58 are provided in disc 50 so that the air may freely pass therethrough to maintain tube 14 in an inflated condition downstream of disc 52. If desired, the embodiment of FIG. 3 can be modified by removing exterior cooling ring 24 in which event tube 14 is cooled solely by the cooling liquid expressed from disc 50.

The following examples are set forth to illustrate more clearly the principle and practice of this invention to those skilled in the art. Where parts or quantities are mentioned, they are parts or quantities by weight unless otherwise noted.

*Examples I–XI*

A series of 1.2 mil and 5 mil films of low density polyethylene are prepared employing the apparatus of FIG. 1. The extruder used has a 2 inch internal diameter and an L/D ratio of 20:1 and a polyethylene metering screw. The die employed has a 3 inch diameter and a lip opening of 0.025 inch. The cored cooling ring has an 8 inch internal diameter and an 8 mil slit opening. The distance between the die face and the slit opening of the cooling ring is 6 inches.

The resin employed, the process conditions employed, the diameter of the expanded bubble and the gauge of the film are set forth in Table I.

TABLE I

| Example No. | I | II | III | IV | V | VI | VII | VIII | IX | X | XI |
|---|---|---|---|---|---|---|---|---|---|---|---|
| Resin | Resin A[1] | Resin A[1] | Resin B[2] | Resin B[2] | Resin C[3] | Resin C[3] | Resin D[4] | Resin D[4] | Resin E[5] | Resin H[6] | Resin A[1] |
| Process Conditions: | | | | | | | | | | | |
| Temp., Feed Zone | 400 | 400 | 400 | 400 | 400 | 400 | 300 | 300 | 350 | 400 | 275 |
| Temp., Delivery Zone | 450 | 450 | 450 | 450 | 450 | 450 | 325 | 325 | 400 | 475 | 375 |
| Temp., Die Zone | 425 | 425 | 425 | 425 | 425 | 425 | 325 | 325 | 425 | 450 | 350 |
| Melt Temperature | 455 | 455 | 450 | 450 | 465 | 465 | 330 | 330 | 400 | 480 | 375 |
| Screw Speed, r.p.m | 108 | 108 | 108 | 108 | 108 | 108 | 108 | 108 | 85 | 108 | 108 |
| Wind Up Speed, ft./min | 95 | 95 | 100 | 76 | 97 | 75 | 75 | 75 | 76 | 93 | 360 |
| Extrusion Rate, lbs./hr | 92 | 92 | 96 | 96 | 94 | 94 | 96 | 96 | 75 | 89 | 88 |
| Cooling Water Temp., °F | 125 | 125 | 125 | 125 | 125 | 125 | 120 | 165 | 120 | 125 | 130 |
| Diameter Expanded Bubble, inches | 3.9 | 5.1 | 3.9 | 5.1 | 3.9 | 5.1 | 5.1 | 5.1 | 5.1 | 3.9 | 5.1 |
| Film Gauge, inch | 0.005 | 0.005 | 0.005 | 0.005 | 0.005 | 0.005 | 0.005 | 0.005 | 0.005 | 0.005 | 0.00125 |

[1] Polyethylene having a density of 0.918 and a melt index of 0.5.
[2] Polyethylene having a density of 0.923 and a melt index of 0.8.
[3] Polyethylene having a density of 0.922 and a melt index of 0.5.
[4] Polyethylene having a density of 0.926 and a melt index of 2.0.
[5] Polyethylene having a density of 0.924 and a melt index of 1.2.
[6] Polyethylene having a density of 0.918 and a melt index of 0.5.

A series of 11 control resins are prepared under the identical conditions set forth in Table I, except that the resin is not contacted with water, but rather is cooled with a conventional air cooling ring. A necesary reduction is made in the rate of extrusion so that the expanded tube would not fuse together when passed through the nip rolls.

In each instance, the films prepared by the process of the invention, as compared with the control process, have strikingly greater transparency, strikingly less haze, materially better gloss, materially better impact strength and a lower density.

While the examples and the drawings illustrate the manufacture of blown-film, the process of the invention is not limited to processes in which the extruded tube is expanded. In some instances, particularly in the manufacture of heavy wall tubing for use in the manufacture of industrial bags and the like, it is not necessary to expand the tube.

Any thermoplastic resin susceptible to conversion into film can be employed in the process of the present invention. By following the procedures described herein, high-quality film has been produced from nylon 6, polypropylene and linear polyethylene in addition to the high-pressure polyethylene as illustrated in the examples.

As noted in the examples, polyethylene film obtained by the method of this invention, as compared with film prepared from the same polyethylene resin by a conventional blow-extrusion process, has a lower density, better strength at the crease line, higher impact strength, higher tensile strength in the cross-machine direction and better optical clarity. The reasons why such improved properties are obtained are not obvious.

The polymer films prepared by the method of this invention, as compared with the corresponding films prepared from the same resin by conventional blow-extrusion methods will, in virtually all instances, have better transparency, lower haze, better gloss, higher impact strength and a lower density.

The above descriptions and particularly the drawings and the examples are set forth by way of illustration only. Many other variations and modifications thereof will be apparent to those skilled in the art and can be employed without departing from the spirit and scope of the invention herein described.

What is claimed is:

In a blow-extrusion process for preparing thin gauge film of an ethylene homopolymer in which the ethylene homopolymer is extruded at a rate of at least about eight pounds per hour per circumferential inch of die opening and at a temperature above about 270° F. into ambient air in tubular form, the extruded tube is withdrawn from the die under positively applied force to orient the ethylene homopolymer in the direction perpendicular to the die face, gas pressure is applied to the interior of the extruded tube to expand the tube and orient the ethylene homopolymer in the direction parallel to the die face, the extruded tube is cooled, collapsed and passed through nip rolls, said cooling accomplished within a distance of about four die diameters downstream of the die face, by directing a stream of water substantially perpendicularly against the exterior surface of the hot expanded tube and cooling the hot tube to below about 180° F. within less than about one second, said stream of water, at least immediately prior to contacting the expanded tube, constituting a solid sheet in a plane substantially parallel to the die face, the improvement which comprises also directing a stream of water substantially perpendicularly against the interior surface of the hot extruded tube, said interior stream of water contacting the hot extruded tube in substantially the same plane as the exterior stream of water so that heat is withdrawn substantially uniformly from both surfaces of the hot extruded tube.

References Cited by the Examiner

UNITED STATES PATENTS

| | | | |
|---|---|---|---|
| 2,955,321 | 10/1960 | Fortner et al. | 18—14 XR |
| 2,987,767 | 6/1961 | Berry et al. | 18—15 |
| 3,090,998 | 5/1963 | Heisterkamp et al. | 18—14 XR |
| 3,170,011 | 2/1965 | Cheney et al. | 18—14 |
| 3,193,547 | 7/1965 | Schott | 264—209 |
| 3,207,823 | 9/1965 | Glyde et al. | 18—14 |
| 3,226,459 | 12/1965 | Tijunelis | 264—210 XR |

ROBERT F. WHITE, *Primary Examiner.*

L. S. SQUIRES, A. R. NOE, *Assistant Examiners.*